United States Patent
Puri et al.

(10) Patent No.: US 8,892,757 B2
(45) Date of Patent: Nov. 18, 2014

(54) METHODS AND APPARATUS FOR INTELLIGENT SELECTION OF A TRANSPORT PROTOCOL FOR CONTENT STREAMING

(75) Inventors: Ajay Puri, Toronto (CA); Paulo Sam, Markham (CA); Haoran Song, Richmond (CA); Chang-Fung Yang, Mississauga (CA)

(73) Assignee: BlackBerry Limited, Waterloo (CA)

( * ) Notice: Subject to any disclaimer, the term of this patent is extended or adjusted under 35 U.S.C. 154(b) by 618 days.

(21) Appl. No.: 12/856,870

(22) Filed: Aug. 16, 2010

(65) Prior Publication Data

US 2011/0087795 A1    Apr. 14, 2011

Related U.S. Application Data

(60) Provisional application No. 61/251,146, filed on Oct. 13, 2009.

(51) Int. Cl.
G06F 15/16 (2006.01)
H04L 29/06 (2006.01)
H04L 12/24 (2006.01)
H04L 29/08 (2006.01)
H04L 29/02 (2006.01)

(52) U.S. Cl.
CPC .......... *H04L 69/16* (2013.01); *H04L 29/08576* (2013.01); *H04L 41/083* (2013.01); *H04L 29/08585* (2013.01); *H04L 29/06326* (2013.01); *H04L 29/02* (2013.01); *H04L 67/14* (2013.01); *H04L 65/4069* (2013.01); *H04L 65/4092* (2013.01); *H04L 65/608* (2013.01); *H04L 65/80* (2013.01)

USPC .......... 709/230; 709/203; 709/217; 709/227; 709/238

(58) Field of Classification Search
USPC ......... 709/203, 217, 220, 227, 230, 238, 224, 709/228; 370/395.5, 395.52
See application file for complete search history.

(56) References Cited

U.S. PATENT DOCUMENTS

| | | | | |
|---|---|---|---|---|
| 5,802,065 A * | 9/1998 | Ogawa et al. | ........ | 370/469 |
| 6,029,200 A * | 2/2000 | Beckerman et al. | ........ | 709/226 |
| 6,266,701 B1 * | 7/2001 | Sridhar et al. | ........ | 709/232 |
| 6,324,582 B1 * | 11/2001 | Sridhar et al. | ........ | 709/230 |
| 6,347,340 B1 * | 2/2002 | Coelho et al. | ........ | 709/246 |
| 6,415,327 B1 * | 7/2002 | Beckerman et al. | ........ | 709/231 |
| 6,999,432 B2 * | 2/2006 | Zhang et al. | ........ | 370/328 |
| 7,171,670 B2 * | 1/2007 | Motoyama et al. | ........ | 719/310 |
| 7,412,516 B1 | 8/2008 | Brown et al. | | |
| 7,554,983 B1 | 6/2009 | Muppala | | |
| 7,573,820 B2 * | 8/2009 | Krishnaswamy et al. | ..... | 370/235 |
| 7,701,856 B2 * | 4/2010 | Marcondes et al. | ........ | 370/235 |
| 7,856,035 B2 * | 12/2010 | Pierce et al. | ........ | 370/473 |
| 7,894,364 B2 * | 2/2011 | Baron et al. | ........ | 370/252 |
| 7,907,586 B2 * | 3/2011 | Al-Zain et al. | ........ | 370/342 |

(Continued)

OTHER PUBLICATIONS

EP Application No. 10172961.4, Extended European Search Report dated Dec. 7, 2010.

*Primary Examiner* — Michael Y Won
(74) *Attorney, Agent, or Firm* — Moffat & Co.

(57) ABSTRACT

A method and apparatus for intelligent selection of a transport protocol for streaming content is presented. Successful use of transport protocol over each data network infrastructure is tracked for each streaming content server. Subsequent content playback requests sent to streaming content servers default to previous successfully employed transport protocol over a data network infrastructure.

25 Claims, 8 Drawing Sheets

(56) References Cited

U.S. PATENT DOCUMENTS

| | | | |
|---|---|---|---|
| 7,907,609 B2* | 3/2011 | Kapoor et al. | 370/389 |
| 7,920,569 B1* | 4/2011 | Kasturi et al. | 370/392 |
| 8,005,971 B2* | 8/2011 | Walls et al. | 709/230 |
| 8,045,521 B2* | 10/2011 | Godavarti et al. | 370/331 |
| 2001/0047421 A1* | 11/2001 | Sridhar et al. | 709/230 |
| 2002/0184373 A1* | 12/2002 | Maes | 709/228 |
| 2003/0182437 A1* | 9/2003 | Kobayashi et al. | 709/232 |
| 2005/0220027 A1 | 10/2005 | Setton et al. | |
| 2008/0072322 A1* | 3/2008 | Guruswamy | 726/22 |
| 2008/0144503 A1* | 6/2008 | Persson et al. | 370/235 |
| 2010/0082777 A1* | 4/2010 | Montgomery et al. | 709/220 |
| 2011/0069616 A1* | 3/2011 | Revels | 370/236 |
| 2011/0142063 A1* | 6/2011 | Kasturi et al. | 370/401 |
| 2011/0228751 A1* | 9/2011 | Takagi et al. | 370/338 |
| 2011/0246660 A1* | 10/2011 | Bouazizi | 709/231 |
| 2011/0299540 A1* | 12/2011 | Chen et al. | 370/401 |
| 2012/0191871 A1* | 7/2012 | Ha | 709/232 |
| 2012/0266214 A1* | 10/2012 | Hagiu et al. | 726/3 |

* cited by examiner

METHODS AND APPARATUS FOR INTELLIGENT SELECTION OF A TRANSPORT PROTOCOL FOR CONTENT STREAMING

RELATED APPLICATIONS

The present disclosure claims priority from U.S. Provisional Application No. 61/251,146, filed Oct. 13, 2009, the entire contents of which are incorporated herein by reference.

FIELD OF THE DISCLOSURE

The present disclosure relates to streaming content, and in particular to transport protocols for content streaming.

BACKGROUND

Recent developments in mobile devices have made it possible for handheld mobile devices to subscribe to data and content delivery services. Such services may delivered over a cellular telecommunications network infrastructure supporting data, or over wireless data networks. A recent convergence in handheld mobile devices has led to multimode handheld mobile devices capable of both cellular telecommunications including data communications, and wireless data communications. These may be known as wireless data devices, smart phones, voice enabled personal digital assistants, among others.

Content may be streamed to mobile handheld devices in certain situations. For example, streaming content may include, but is not limited to: stock quotes, news headlines, telephony, Internet radio, audio, video, teleconferencing, video teleconferencing, web-based push to talk features, among others. "Streaming" may typically entail conveying streaming content in real time from a content source, for example a content server, to a destination, for example a mobile handheld device, where the content is consumed (displayed or played back) in real time.

Content may be streamed, for example, using a cellular telecommunications network infrastructure or a wireless data network infrastructure. Streaming content to handheld mobile devices using a cellular telecommunications network infrastructure may include conveying content from a content server, through public communications network infrastructure, then through a telecommunications carrier's network infrastructure wherein the user of the handheld device subscribes to general data services provided by the carrier, and ultimately to the handheld mobile device. In order to comply with service quality requirements of key services, carriers may control all other data traffic. A firewall may be employed by carriers between the public communications network infrastructure and the carrier's network infrastructure. The firewall is typically used to prevent abuse of carrier's network resources.

Streaming content to handheld mobile devices employing wireless data network infrastructure may involve conveying content from a content server, through public communications network infrastructure, then through an Internet service provider's network infrastructure, through a wireless access point wherein the operator of the wireless access point subscribes to general data services provided by the internet service provider, and ultimately to the handheld mobile device. A firewall may be employed between the public communications network infrastructure and the wireless access point. The firewall is typically used to prevent abuse of assets and resources downstream of the access point.

In some cases, the complex setup and configuration employed in streaming content overwhelms firewalls. This can degrade the performance of a device if the firewall prevents the streaming content from reaching the device

BRIEF DESCRIPTION OF THE DRAWINGS

Referring to the drawings, wherein like reference numerals indicate similar parts throughout the several views, several aspects of the method and apparatus described herein are illustrated by way of example, and not by way of limitation, wherein.

DETAILED DESCRIPTION OF THE DRAWINGS

Figure 1:
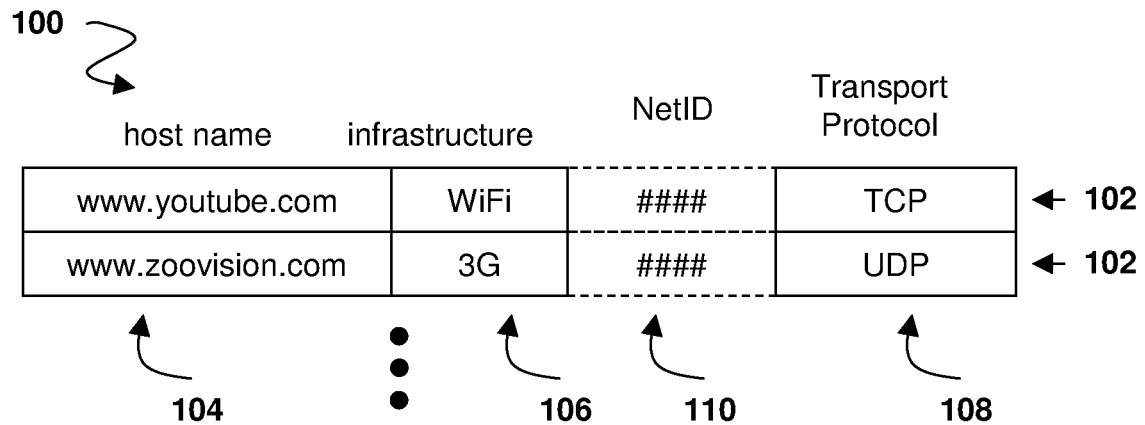
FIG. 1 is a schematic diagram showing elements implementing transport protocol tracking for streaming services.

As used herein, a mobile device may be any device capable of communicating with a cellular telecommunications infrastructure or wireless data access point, and includes but is not limited to a cellular telephone, personal digital assistant, two way pager, smart phone, laptop computer, among others.

A cellular telecommunications infrastructure includes, but is not limited to: various network infrastructures, including but not limited to Global System for Mobile Communication (GSM), GSM Packet Radio Service (GPRS), Code Division Multiple Access (CDMA), CDMA2000, Evolution Data Only (EVDO), Universal Mobile Telecommunications System (UMTS), Long Term Evolution (LTE), Long Term Evolution Advanced (LTE-A), among others etc.

Wireless data networks may include, but are not limited to Institute for Electronic and Electrical Engineers (IEEE) 802.11 compliant wireless data networks such as wireless fidelity (WiFi) and IEEE 802.16 WiMAX networks.

As indicated above, content streaming is typically done in real time. The real time aspects of content streaming distinguish the conveying of content by streaming from the conveying of content by downloading. Streaming has varied requirements, some of which are content specific. For example, depending on the application, video streaming may entail coordinated conveyance of video and audio streams at a video frame rate.

A Real Time transport Protocol (RTP) is employed end-to-end for the purpose of coordinating real-time streaming content sourcing, streaming content delivery across communications network infrastructure, and streaming content queuing for real time playback. RTP defines a standardized packet format for conveying audio and video over a data network infrastructure. RTP employs a content transport protocol to convey streaming content. A Real Time Streaming Protocol (RTSP) is employed to control streaming content playback.

RTSP is a network control protocol used to control streaming content servers. The RTSP protocol is described in the Internet Engineering Task Force (IETF) RFC2326 "Real Time Streaming Protocol", April 1998. Control streaming content sessions are established between client and streaming content server end points using RTSP. Without implying limitations, clients, including mobile data devices, issue video cassette recorder (VCR)-like commands, such as PLAY and PAUSE, to streaming content servers to facilitate real-time control of playback of streaming content from a streaming content server. Clients may also issue other non-VCR like commands, such as but not limited to: OPTIONS, DESCRIBE, SETUP, etc. Streaming content servers use the RTP for conveying streaming content.

RTP relies on lower lever transport protocols in the Open Systems Interconnect (OSI) hierarchy to transport content data packets. For example, in the Internet Protocol hierarchy, RTP may employ, without being limited to either: the Universal Datagram Protocol (UDP) or the Transport Control Protocol (TCP) for transporting content data packets. The choice provides a balance between processing overheads and quality of service. The RTSP protocol may typically employ the TCP transport protocol to transport control packets. The UDP transport protocol may also be used to transport control packets.

Streaming content to handheld mobile devices through a carrier's firewall or a firewall at the access point may prevent the streaming data from reaching a mobile device. As will be appreciated by those in the art, a firewall operates on a group of rules which attempt to allow only legitimate connections to be established through the firewall. As a general rule the only download connections allowed through the firewall are those which correspond to previously initiated upload connections.

A side effect of employing a firewall is that the complex setup and configuration employed in streaming content may overwhelm firewalls. As a typical example, a carrier may require the use of an RTP/UDP transport protocol suite for conveying streaming content data packets, while a streaming content server primarily employs RTSP/TCP to request and setup a streaming content session. In accordance with typical firewall rules, a streaming content session initiated via RTSP/TCP will be blocked by the firewall because no UDP upload exchange was initiated from behind the firewall in order for a download allow rule to trigger. The result is that user of the mobile device can access a streaming content server; however no streaming content can reach the mobile device.

Various solutions to overcome firewall issues may be hole punching technology, such as that used by Skype™ VoIP service by Skype Ltd. Here, an RTSP/TCP request is sent upstream and dummy RTP/UDP packets are sent upstream to fool the firewall rules to accept service RTP/UDP packets downstream. However, Trojan-horse security attacks may employ the same methodology and intelligent firewalls have been developed to foil such attempts.

Another attempt to overcome firewall issues includes waiting after an attempted initiation to determine whether streaming content is received and, if not, sending a subsequent RTSP request using the UDP transport protocol. The use of the technique is, for example, performed on a RealNetworks Player™ by RealNetworks Inc. However, the period of time spent for each streaming content playback request attempt in both waiting to determine whether streaming content is being received together with the second period of time spent in processing a subsequent RTSP request may be too long for certain applications. For example, the stream playback start delay is one user experience indicator in streaming content to handheld mobile devices.

The present disclosure provides methods and apparatus to reduce stream playback start delay by intelligently selecting a transport protocol for streaming content. The successful use of a transport protocol over each data network infrastructure is tracked for each streaming content server. Subsequent content playback requests sent to streaming content servers default to a previously successfully employed transport protocol over a data network infrastructure. Tracking and use of previous transport protocols employed over data network infrastructure for each streaming content server reduces the stream playback start delay to improve user experience.

Accordingly, a method is provided for selecting a transport protocol for streaming content to a mobile device. The method includes tracking previous successful use of one of a plurality of transport protocols in conveying streaming content over a corresponding one of a plurality of data network infrastructures in a configuration repository at the mobile device; and defaulting to employing the previously successfully used transport protocol corresponding to a data network infrastructure with which the mobile device is associated to provide data communications to the mobile device.

Further, a mobile device is provided which is adapted to select a transport protocol for conveying streaming content thereto. The mobile device includes: at least one radio frequency transceiver configured to establish data communications via at least two data network infrastructures; a processor; memory storage; a configuration repository stored in said memory storage; and coded machine logic stored in said memory storage. Said coded machine logic is executable on said processor to: track, in said configuration repository, previous successful use of one of a plurality of transport protocols in conveying streaming content over a corresponding one of said at least two data network infrastructures; and default to employing the previously successfully used transport protocol specified in said configuration repository corresponding to a data network infrastructure with which the mobile device is associated to provide data communications to said mobile device.

Reference is now made to the drawings. The detailed description set forth below in connection with the appended drawings is intended as a description of various embodiments and is not intended to represent the only embodiments contemplated. The detailed description includes specific details for the purpose of providing a comprehensive understanding of the subject matter described. However, it will be apparent to those skilled in the art that the methods described herein may be practiced without these specific details.

In accordance with one embodiment, intelligent selection of a transport protocol for streaming content employs a selection process which tracks successful use of a transport protocol over each of a plurality of data network infrastructures. The process may be extended to track the successful use of a transport protocol over each of a plurality of data network infrastructures for each streaming content server. Subsequent content playback requests sent to streaming content servers default to previously successfully employed transport protocols over a data network infrastructure.

Reference is now made to FIG. 1, which is a schematic diagram showing elements implementing transport protocol tracking for previously successful streaming services. A configuration repository may be employed to track successfully used transport protocols over data network infrastructures. For example, the configuration repository may include a configuration lookup table 100. Configuration lookup table 100 includes configuration entries 102. Depending on the implementation, each configuration entry 102 may have two or more fields.

In accordance with one embodiment, successful use of transport protocols in conveying streaming content is tracked on a per data network infrastructure basis. For such an embodiment, each configuration entry 102 has an infrastructure field 106 for specifying data network infrastructure, and a transport protocol field 108 for specifying a default transport protocol for use conveying streaming content over the corresponding data network infrastructure. Data network infrastructures include, without being limited thereto: wireless data network infrastructures and cellular communications data network infrastructures, as provided above.

Transport protocols include, without being limited thereto: Transport Control Protocol (TCP), Universal Datagram Protocol (UDP), among others. The present disclosure is not limited to two transport protocols, and other embodiments could exist wherein three or more transport protocols may be employed in conveying streaming content as described herein below.

In accordance with another embodiment, successful use of transport protocols in conveying streaming content is tracked on a per data network infrastructure basis for each of a multitude of streaming content servers. For such an embodiment, each configuration entry 102 further includes a host name field 104 for specifying a host name specification. This may, for example, be a Universal Resource Locator (URL) string employed in an RTPS stream setup request to start streaming content. Examples of host name specifications include: www.youtube.com, www.zoovision.com, among others. In accordance with this embodiment, each transport protocol specification in transport protocol field 108 is understood to correspond to the host name and infrastructure combination specified in fields 104 and 106 of the same table entry 102.

Other embodiments may include tracking successful transport protocol use on a per network identifier basis. For WiFi or WiMAX, the SSID may be employed as the network identifier. This is shown by network identifier field 110.

Figure 2:
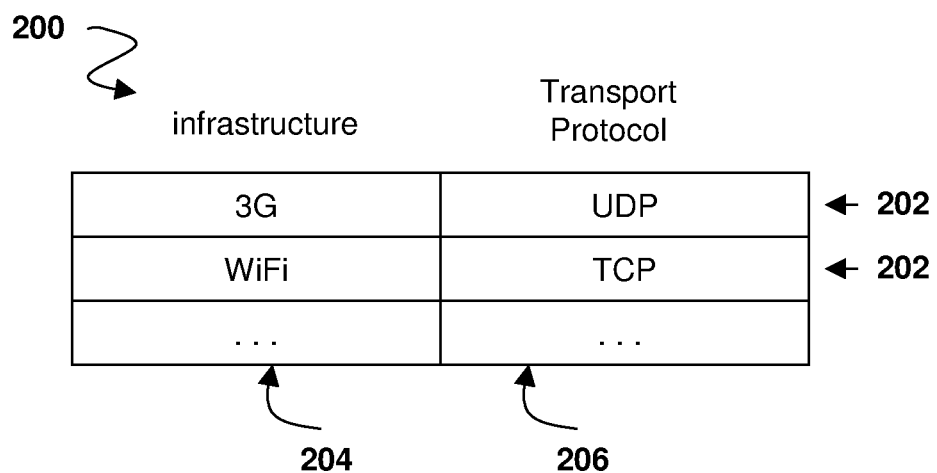
FIG. 2 is a schematic diagram showing elements implementing initial transport protocol default specification on a per data network infrastructure basis.

Reference is now made to FIG. 2, which is a schematic diagram showing elements implementing initial transport protocol defaults on a per data network infrastructure basis. FIG. 2 shows a transport protocol initial defaults table 200, which is part of the configuration repository. The transport protocol initial defaults table 200 includes initial defaults entries 202.

In accordance with one embodiment, each entry 202 has two fields. A first field 204 is employed to specify a data network infrastructure and a second field 206 is employed to specify an initial default transport protocol.

In an alternative embodiment to FIG. 2, initial default transport protocol specifications could be provided on a per network identifier basis.

Figure 3:
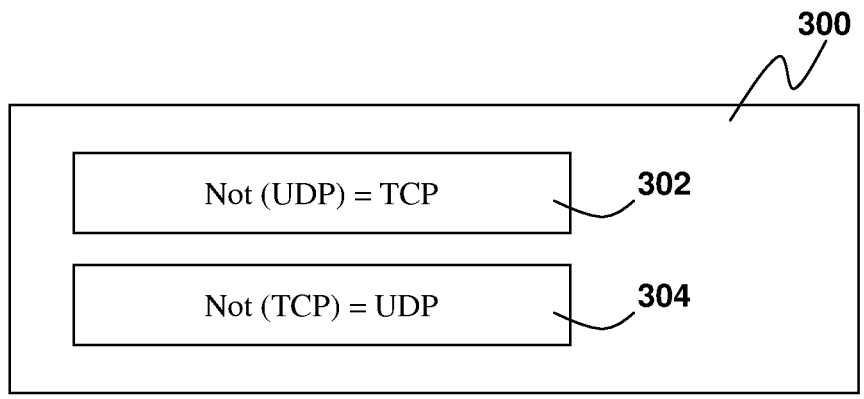
FIG. 3 is a schematic diagram showing elements implementing transport protocol toggling.

Reference is now made to FIG. 3, which is a schematic diagram showing elements implementing transport protocol toggling. In accordance with one embodiment, FIG. 3 shows a transport protocol toggling module 300 providing toggling between a pair of transport protocols. Module 300 may include, without being limited thereto: machine logic implemented in hardware, or coded machine logic implemented as firmware or software. Module 300 includes toggling blocks 302 and 304.

Thus, in the example of FIG. 3, the pair of transport protocols includes TCP and UDP. To toggle from a UDP transport protocol, toggling block 302 may be used to return the TCP transport protocol as the opposite of the UDP protocol. Conversely, to toggle from a TCP transport protocol, toggling block 304 may return the UDP transport protocol as the opposite of the TCP protocol. Successive calls to transport protocol toggling module 300 return alternate transport protocols.

Figure 4:
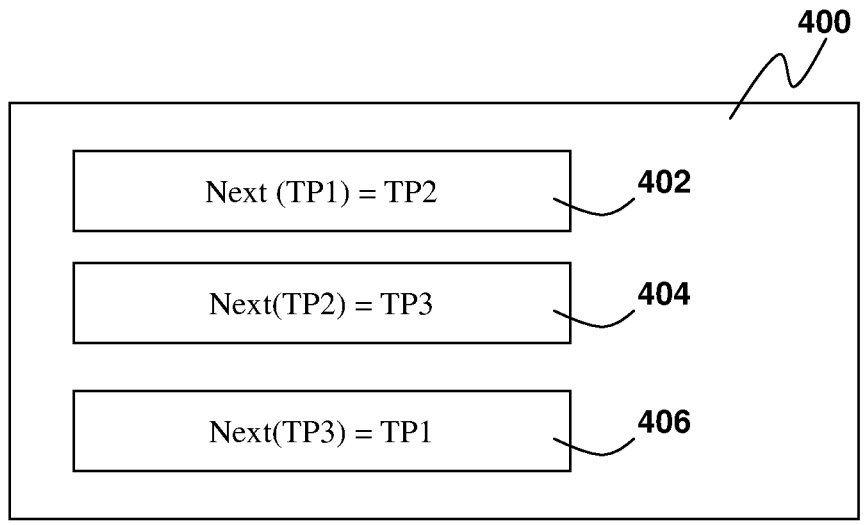
FIG. 4 is a schematic diagram showing elements implementing transport protocol cycling.

Reference is now made to FIG. 4, which is a schematic diagram showing elements implementing transport protocol cycling. Thus, if more than two transport protocols are used, the embodiment of FIG. 4 may be employed.

FIG. 4 shows a transport protocol cycling module 400 providing cycling between a group of transport protocols. Module 400 includes a number of cycling blocks 402, 404 and 406. Each cycling block represents the cycling from one transport protocol to another. For example, the group of transport protocols of FIG. 4 includes three transport protocols TP1, TP2, TP3. A cycling block 402 may return the TP2 transport protocol as the next transport protocol to the TP1 transport protocol. A cycling block 404 may return the TP3 transport protocol as the next transport protocol to the TP2 transport protocol. A cycling block 406 may return the TP1 transport protocol as the next transport protocol to the TP3 transport protocol.

The example of FIG. 4 is not meant to be limiting, and any number of transport protocols may be utilized.

Figure 5:
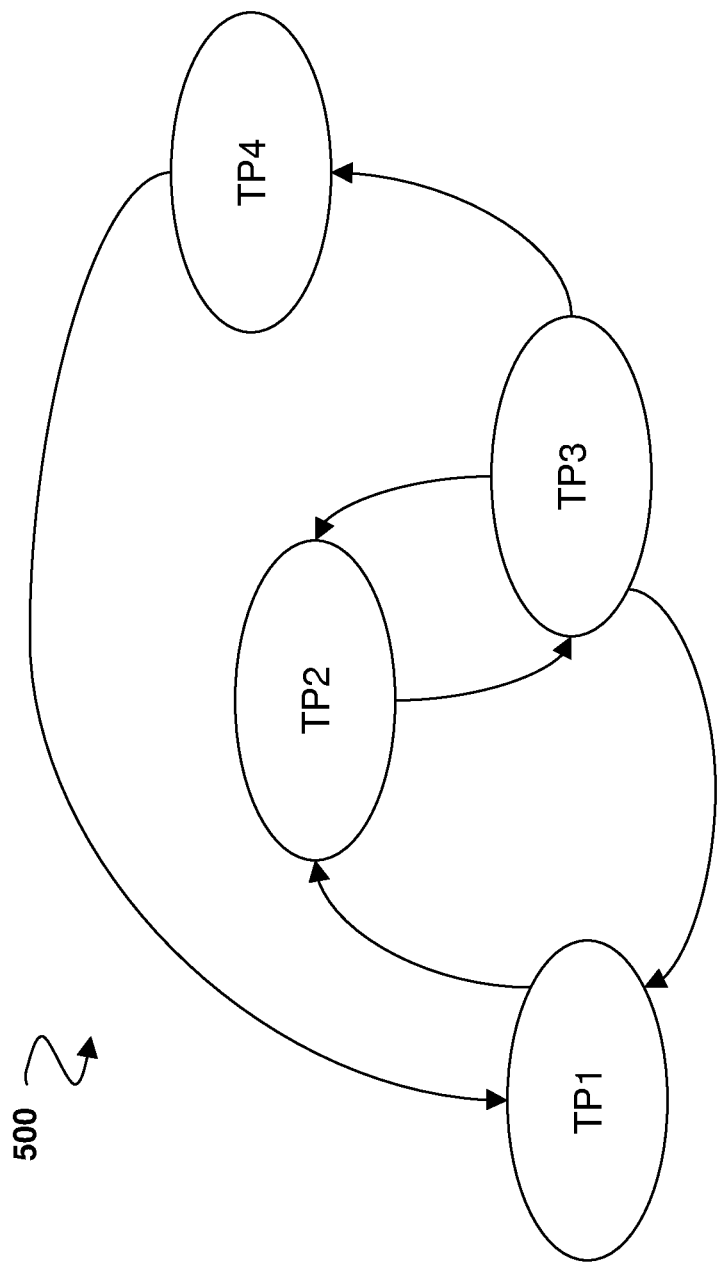
FIG. 5 is a schematic diagram showing elements implementing transport protocol switching.

In other embodiments, switching between transport protocols may require more intelligence and a state machine may be used. Reference is now made to FIG. 5, which is a schematic diagram showing elements implementing transport protocol switching. Module 500 includes a state machine represented by state nodes and state transitions. State nodes represent transport protocols, while the state transitions represent successive invocations of transport switching protocol module 500. The state machine 500 is not limited to a transport protocol toggling or transport protocol cycling although such functionality by be implemented. In one embodiment state transitions utilize parameters such as but not limited to one or more of a data networking infrastructure and network identifiers.

In accordance with one embodiment, a configuration repository is implemented for intelligent transport protocol selection that remembers which transport protocol to use for streaming for a given hostname and data network infrastructure combination (e.g. www.abcstreaming.com on Wifi and www.abcstreaming.com on third generation (3G) will have different entries in the configuration repository). In one embodiment, transport protocol use for content streaming purposes defaults to UDP if there is no entry in the repository for a cellular data network infrastructure, and by default to TCP over Wifi.

Whichever protocol the configuration repository returns (or a default such as UDP if there is no entry) is employed first to attempt a stream start. If the attempt fails, the configuration repository is updated to use the other transport protocol and that other transport protocol is employed in a second stream start attempt.

Content streaming over UDP is considered a failure if no streaming data is received over UDP for a default time period, for example 10 seconds, after the expected stream start. Stream start failure may happen if a firewall in the cellular or wifi data network is blocking the UDP traffic. Content streaming over TCP may fail if TCP is not supported by the streaming server.

All entries in the configuration repository for a data network infrastructure may be cleared in one embodiment when connectivity over the data network infrastructure goes down.

In accordance with a first embodiment, the configuration repository returns UDP as the initial default transport protocol, a stream start is attempted to the streaming server in order to playback streaming content using UDP. If UDP traffic is received then stream start is successful and the selection process ends.

If UDP traffic is not received for the default time duration then the configuration repository is updated to default to TCP and a stream start is issued for streaming content over TCP. If the streaming server supports TCP then a SETUP/PLAY command may be issued to control playback in which case the stream start attempt has been successful and the selection process ends.

If the streaming server does not support TCP then the stream content delivery fails.

In accordance with a second embodiment, the content repository returns TCP as the initial default transport protocol. A stream start is attempted to the streaming server in order to playback streaming content using TCP. If the streaming server supports TCP, then a SETUP/PLAY command may be issued to control playback in which case the stream start attempt has been successful and the process ends.

If the streaming server does not support TCP, then configuration repository is updated to default to UDP and a stream start is issued for streaming content over UDP. If UDP traffic is received then the stream start attempt has been successful and the selection process ends.

If UDP traffic is not received for the default time duration then the stream content deliver fails.

As will be appreciated by those skilled in the art, if three or more protocols exist, the above may be adapted to cycle between the multiple protocols until all protocols have been attempted.

Figure 6:
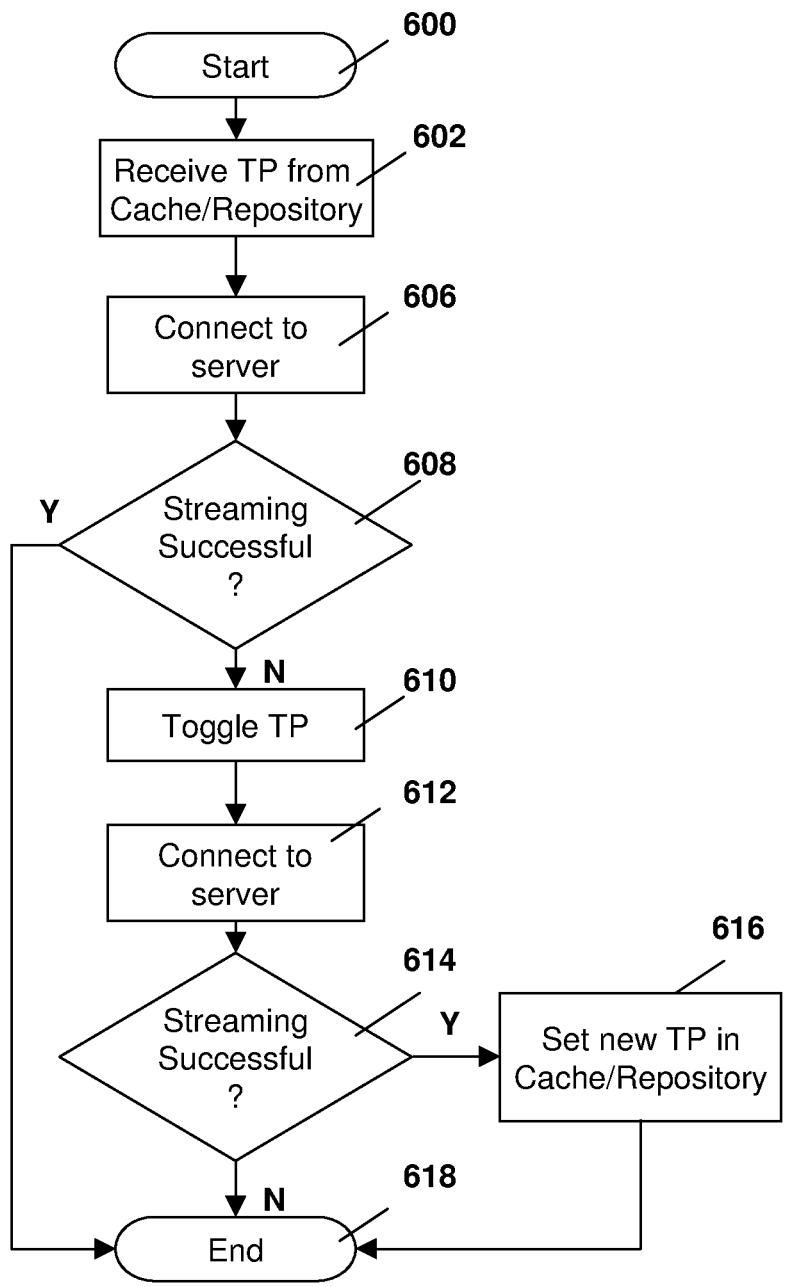
FIG. 6. is a simplified flow diagram showing an example process for utilizing a transport protocol.

Reference is now made to FIG. 6. FIG. 6 shows a simplified flow diagram illustrating the process described above. Specifically, the process of FIG. 6 starts at block 600 and proceeds to block 602 in which a transport protocol is received from a cache or repository. This may be a default value if no value currently exists in the repository. The process then proceeds to block 606 in which a connection is established with a server.

From block 606 the process proceeds to block 608 in which a check is made to determine whether traffic is received over the connection. If yes, the process proceeds to block 618 and ends.

Conversely, from block 608, if no streaming content is received for a predetermined interval, the process proceeds to block 610 and the transport protocol is toggled or cycled. This may be done in accordance with the embodiments of FIG. 3, 4 or 5.

From block 610 the process proceeds to block 612 in which a connection is attempted to a server based on the transport protocol determined from block 610. The process then proceeds to block 614 in which a check is made to determine whether streaming content is received over the connection. From block 614, if streaming content is received the process proceeds to block 616 and sets the new transport protocol in the cache or repository for future connections. The process then proceeds to block 618 and ends.

From block 614, if the connection is not successful then the process proceeds to block 618 and ends. Alternatively, if more than two transport protocols exist, the process may proceed from block 614 to block 610 to cycle to the next untried transport block.

The following is an example of a sequence of events when a firewall blocking streaming content over UDP is encountered:

a. Open stream content connection to streaming server "download.wavetlan.com" over 3G data network infrastructure.

b. Attempt stream start over UDP.

c. After 10 seconds of no traffic being received over UDP, updated configuration repository to default to TCP.

d. If stream start is successful over TCP, content streams until stream content delivery ends successfully and process ends (return to browser).

e. A subsequent stream start attempt to streaming server "download.wavetlan.com" over 3G data network infrastructure defaults to TCP.

f. Stream start attempt over TCP is successful.

g. e/f may be repeated any number of times.

h. Cycle 3G radio.

i. Subsequent stream start attempts to streaming server "download.wavetlan.com" over 3G over data transport infrastructure defaults to UDP.

j. Repeat b/c/d.

Tracking and use of previous transport protocols employed over data network infrastructure for each streaming content server reduces the stream playback start delay thereby improving user experience.

Figure 7:
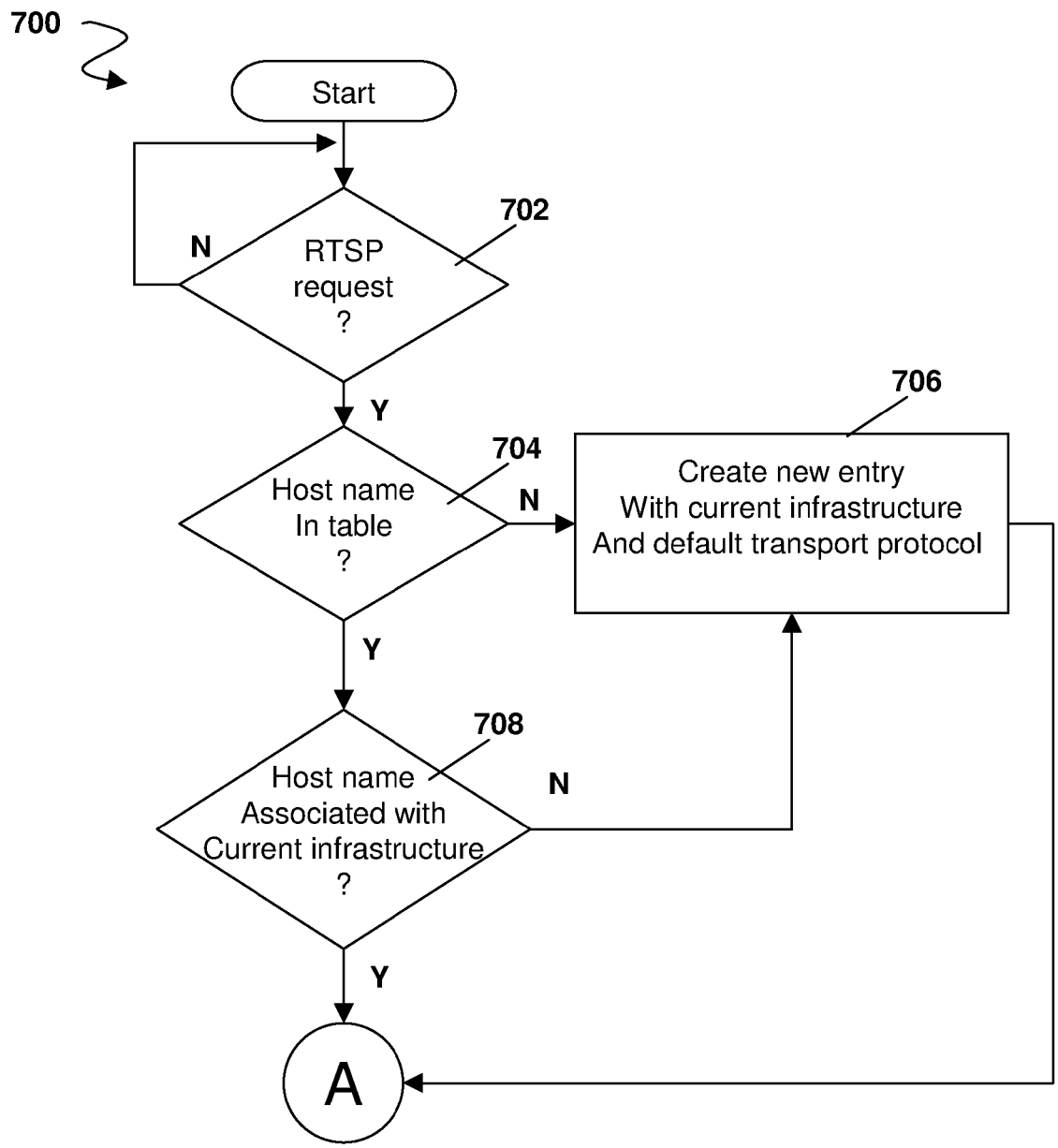
FIG. 7 is a flow diagram showing an example process implementing processing initial stream start requests.
Figure 8:
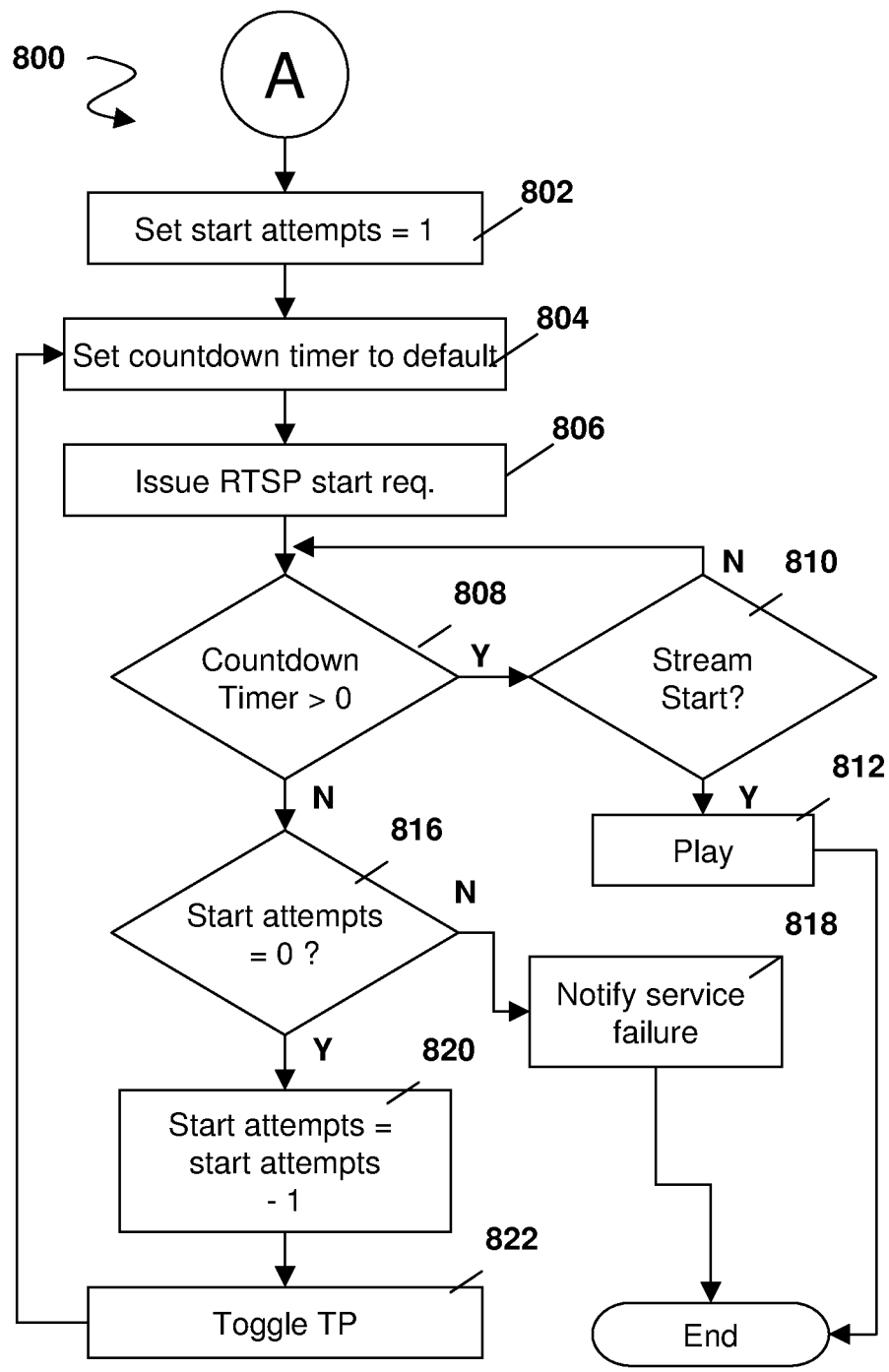
FIG. 8 is a flow diagram showing an example process implementing stream start servicing.

Further details and alternatives for various embodiments are provided with regards to FIGS. 7 and 8. Reference is now made to FIG. 7, which is a flow diagram showing a process implementing processing initial stream start requests. As an example, FIG. 7 shows process 700 a process servicing RTSP stream start requests. For example, an RTSP stream start request may be initiated via a "rtsp://www.youtube.com/streamIDspecification". The process 700 waits for an RTSP stream start request at 702.

If an RTSP stream start request has not been issued, the process returns to decision 702. As soon as a RTSP stream start request has been is issued, process 700 proceeds to decision block 704 wherein the mobile device checks whether the host name of the RTSP stream start request is already in the configuration repository, for example via a table look-up in configuration table 100 using the host name as the search parameter.

If an entry 102 for the stream server specified by the host name of the RTSP request is not found in configuration table 100 at 704, process 700 proceeds to 706 where the mobile device creates a new entry 102 wherein the host name field 104 of new entry 102 is set to the streaming server host name in the RTSP request, the data network infrastructure field 106 of new entry 102 is set to the current data network infrastructure with which the mobile device is associated, and the default transport protocol field 108 of the new entry is set to the initial default transport protocol corresponding to the current active data network infrastructure as determined, for example, from initial defaults table 200 via a table look up with the current active data network as the search parameter.

Returning to decision 704, if the host name is found in the configuration table 100, process 700 determines at 708 whether an entry 102 for the current data network infrastructure exists in configuration table 100. If the look-up fails, process 700 proceeds to 706 wherein a new entry 102 is created in configuration table 100 having the same host name in the host name field 104 however with an different data network infrastructure specification in field 106 and the corresponding different default transport protocol specification in field 108.

If the lookup 708 results in a hit or subsequent to the creation of a new entry 102, process 700 continues with servicing the RTSP stream start request in FIG. 8.

FIG. 8 is a flow diagram showing a process implementing stream start servicing. FIG. 8 shows process 800 servicing the initial RTSP stream start request A register holding a number of stream start attempts is set at 802 to a maximum number of stream start attempts. Depending on the implementation, the maximum number of stream start attempts is equal to the number of transport protocols employed less one. It is envisioned that other factors may be considered setting the number of stream start attempts, perhaps dependent on the current data network infrastructure, network identifier or both.

Process 800 proceeds to 804 where a countdown timer is set to a predetermined period of time, for example 10 seconds.

A first stream start attempt is attempted at 806 employing the host name and the data transport protocol corresponding to the host name and the current active data network infrastructure with which the mobile data device is associated.

Having initiated at 806 the first stream start attempt, process 800 waits at 808 for the duration of the countdown timer to receive streaming content related data, the receipt of which is determined at 810. For example, receive streaming content related data may entail a handshaking transaction, receiving actual streaming content, or both. If streaming content related data is not received at 810 the process proceeds back to 808 to determine if the countdown timer has expired.

If streaming content related data is received at 810 the process proceeds to 812 wherein control playback ensues after which the process ends.

Upon the expiration of the countdown timer at 808, process 800 determines whether all stream start attempts have been exhausted at 816. If all stream start attempts have been exhausted as determined at 816, process 800 may notify RTSP request service failure at 818 before the process ends.

If the maximum number of stream start attempts have not been exhausted, process 800 proceeds to 820 wherein the number of stream start attempts is decreased by 1.

At 822 process 800 changes to a different transport protocol for the current entry 102, and the process resumes from 804. Depending on implementation, changing to a different transport protocol may employ transport protocol toggling, cycling, or switching as described herein above with reference to FIGS. 3 to 5.

Figure 9:
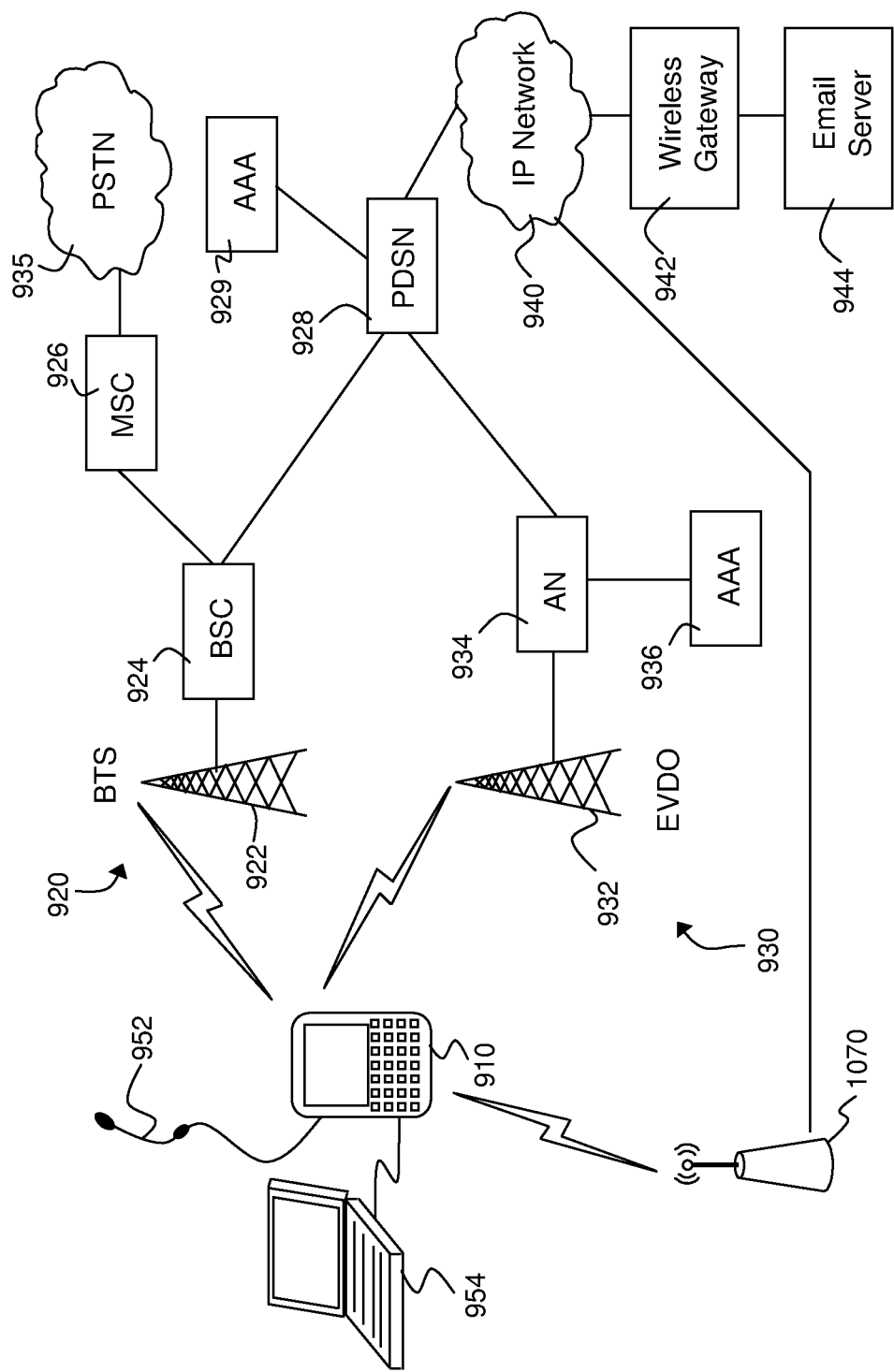
FIG. 9 is a block diagram showing an exemplary hybrid data network infrastructure deployment.

As indicated, the above may be implemented on any network. Reference is now made to FIG. 9. FIG. 9 is a block diagram of an exemplary wireless data network for the CDMA/EVDO network example and in accordance with the present disclosure and with which the various embodiments of the method of the instant disclosure may cooperate. This is merely shown as an example and is not meant to be limiting.

FIG. 9 shows a block diagram of a mobile device 910 and exemplary CDMA 1x network 920, an exemplary EVDO network 930, a public switched telephone network (PSTN) 935, a data network 940, wireless gateway 942 and e-mail server 944. The mobile device 910 is typically a two-way communication device having data and voice communication capabilities. FIG. 9 further shows an access point 1070 for use with an alternative data connection such as a WiFi connection.

CDMA network 920 is comprised of a base transceiver station (BTS) 922 and a base station controller (BSC) 924. Base station controller 924 communicates with a mobile switching centre 926 which, as will be appreciated, is a circuit switched only component communicating with PSTN 935. Base station controller 924 further communicates with a packet data serving node (PDSN) 928 which is a packet switched only component. PDSN 928 further communicates with IP network 940.

EVDO network 930 contains an EVDO sector 932 which communicates with access node (AN) 934. Since the EVDO network 930 is a data only network, access node 934 communicates only with PDSN 928 and not with any circuit switch components.

An authentication, authorization and accounting node 936 is associated with AN 934, and a similar node 929 is associated with PDSN 928.

Operationally, mobile device 910 communicates wirelessly with CDMA network 920 using BTS 922 and BSC 924 to gain access to the CDMA 1x network.

Mobile device 910 sends and receives both data and voice services through CDMA network 920 until an EVDO network connection with established. Base station controller 924 communicates with circuit switched services provided by MSC 926 such as voice and short message service (SMS) via PSTN 935.

Prior to an EVDO connection being established, mobile device 910 further communicates wirelessly with BTS 922 and BSC 924 to gain access to packet data services provided by PDSN 928, such as e-mail, wireless application protocol (WAP) and other data services via data network 940. Such services are provided through wireless gateway 942 and servers such as e-mail server 944.

Once a network connection is established with CDMA 1x network 920 and the mobile device enters CDMA 1x idle state, wireless device 910 establishes a connection with EVDO network 930. This is done through EVDO sector 932 and AN 934. In this way, mobile device 910 gains access to packet data services provided by PDSN 928 using EVDO network 930. Subsequent to the establishment of an EVDO network connection with mobile device 910, CDMA network 920 is used to provide circuit switched services such as voice and SMS while EVDO network 930 is used to provide packet data services such as e-mail and WAP.

As will be appreciated by those skilled in the art, wireless device 910 can include voice communication means such as a headpiece 952 or a user can communicate directly into the wireless device 910.

Further, due to high transfer rates associated with EVDO networks, wireless device 910 can be used as a wireless modem and be connected through various means such as a USB or other serial port, or by short range wireless communications with a computer 954. Computer 954 can then gain access to data network 940 through EVDO network 930 using mobile device 910 as the modem.

Mobile device 910 may further have capabilities to communicate through access point 1070 using, for example, WiFi. Access point 1070 connects to a data network 940 and thus access to wireless gateway 942 and email server 944 are possible through access point 1070.

Figure 10:
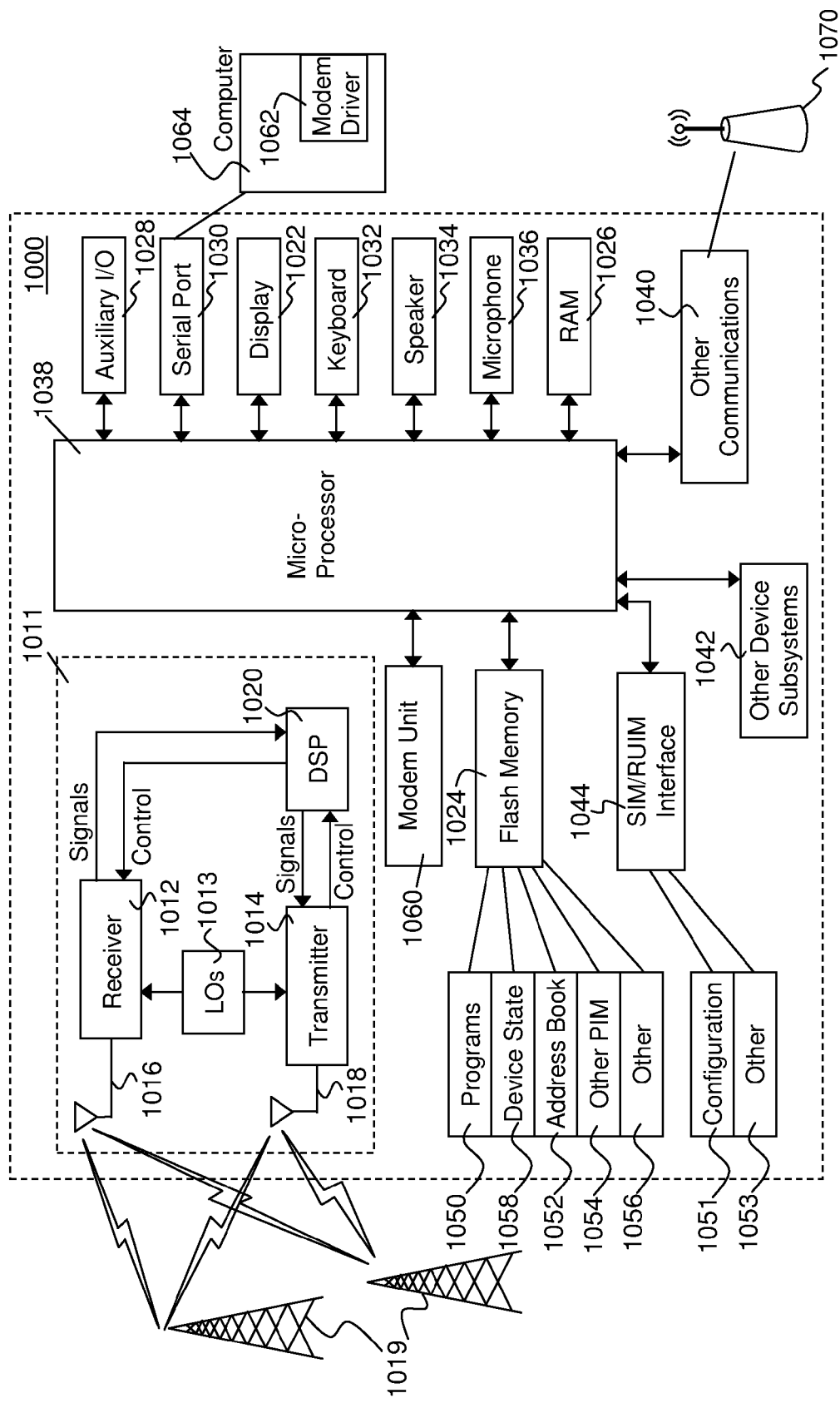
FIG. 10 is a block diagram of an exemplary mobile device that can be used in accordance with the present application.

Reference is now made to FIG. 10. FIG. 10 is a block diagram illustrating a mobile device capable of being used with various embodiments of the present disclosure. Mobile device 1000 is generally a two-way wireless communication device having at least voice and data communication capabilities. Mobile device 1000 may have the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 1000 is enabled for two-way communication, it will generally incorporate a communication subsystem 1011, including both a receiver 1012 and a transmitter 1014, as well as associated components such as one or more, preferably embedded or internal, antenna elements 1016 and 1018, local oscillators (LOs) 1013, and a processing module such as a digital signal processor (DSP) 1020. As will be apparent to those skilled in the field of communications, the particular design of the communication subsystem 1011 will be dependent upon the communication network in which the device is intended to operate. For example, mobile device 1000 may include a communication subsystem 1011 designed to operate within the CDMA 1x/EVDO hybrid system.

Network access requirements will also vary depending upon the type of network 1019. In some networks network access is associated with a subscriber or user of mobile device 1000. A mobile device may require a removable user identity module (RUIM) or a subscriber identity module (SIM) card in order to operate on a network. The SIM/RUIM interface 1044 is normally similar to a card-slot into which a SIM/RUIM card can be inserted and ejected like a diskette or PCMCIA card. The SIM/RUIM card can have memory and hold key configuration 1051, and other information 1053 such as identification, and subscriber related information.

When required network registration or activation procedures have been completed, mobile device 1000 may send and receive communication signals over the network 1019. As illustrated in FIG. 10, network 1019 can consist of multiple base stations communicating with the mobile device.

Signals received by antenna 1016 through communication network 1019 are input to receiver 1012, which may perform such common receiver functions as signal amplification, frequency down conversion, filtering, channel selection and the like, and in the example system shown in FIG. 9, analog to digital (A/D) conversion. A/D conversion of a received signal allows more complex communication functions such as demodulation and decoding to be performed in the DSP 1020. In a similar manner, signals to be transmitted are processed, including modulation and encoding for example, by DSP 1020 and input to transmitter 1014 for digital to analog conversion, frequency up conversion, filtering, amplification and transmission over the communication network 1019 via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Mobile device 1000 typically includes a processor or microprocessor 1038 which controls the overall operation of the device. Communication functions, including at least data and voice communications, are performed through communication subsystem 1011. Processor or microprocessor 1038 also interacts with further device subsystems such as the display 1022, flash memory 1024, random access memory (RAM) 1026, auxiliary input/output (I/O) subsystems 1028, serial port 1030, two or more keyboards or keypads 1032, speaker 1034, microphone 1036, other communication subsystem 1040 such as a short-range communications subsystem or WiFi or WiMax communications and any other device subsystems generally designated as 1042. If other communications 1040 are WiFi or WiMAX, the communications utilize a communication subsystem such as communication subsystem 1011 to communicate with an access point 1070. Processor 1038 could execute code to suspend or extend a slot cycle for a cellular data connection.

Some of the subsystems shown in FIG. 10 perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list.

Operating system software used by the microprocessor 1038 may be stored in a persistent store such as flash memory 1024, which may instead be a read-only memory (ROM) or similar storage element (not shown). Those skilled in the art will appreciate that the operating system, specific device applications, or parts thereof, may be temporarily loaded into a volatile memory such as RAM 1026. Received communication signals may also be stored in RAM 1026.

As shown, flash memory 1024 can be segregated into different areas for both computer programs 1058 and program data storage 1050, 1052, 1054 and 1056. These different storage types indicate that each program can allocate a portion of flash memory 1024 for their own data storage requirements. Microprocessor 1038, in addition to its operating system functions, may enable execution of software applications on the mobile device. A predetermined set of applications that control basic operations, including data and voice communication applications for example, can be installed on mobile device 1000 during manufacturing.

One software application may be a personal information manager (PIM) application having the ability to organize and manage data items relating to the user of the mobile device such as, but not limited to, e-mail, calendar events, voice mails, appointments, and task items. One or more memory stores may be available on the mobile device to facilitate storage of PIM data items. Such PIM application may have the ability to send and receive data items, via the wireless network 1019. In one embodiment, the PIM data items are seamlessly integrated, synchronized and updated, via the wireless network 1019 or access point 1070, with the mobile device user's corresponding data items stored or associated with a host computer system. Further applications may also be loaded onto the mobile device 1000 through the network 1019 or access point 1070, an auxiliary I/O subsystem 1028, serial port 1030, short-range communications subsystem 1040 or any other suitable subsystem 1042, and installed by a user in the RAM 1026 or a non-volatile store (not shown) for execution by the microprocessor 1038. Such flexibility in application installation increases the functionality of the device and may provide enhanced on-device functions, communication-related functions, or both. For example, secure communication applications may enable electronic commerce functions and other such financial transactions to be performed using the mobile device 1000.

In a data communication mode, a received signal such as a text message or web page download is processed by the communication subsystem 1011 and input to the microprocessor 1038, which then further processes the received signal for output to the display 1022, or alternatively to an auxiliary I/O device 1028. A user of mobile device 1000 may also compose data items such as email messages for example, using the keyboard 1032, may be a complete alphanumeric keyboard or telephone-type keypad, in conjunction with the display 1022 and possibly an auxiliary I/O device 1028. Such composed items may then be transmitted over a communication network through the communication subsystem 1011.

For voice communications, overall operation of mobile device 1000 is similar, except that received signals would be generally output to a speaker 1034 and signals for transmission would be generated by a microphone 1036. Alternative voice or audio I/O subsystems, such as a voice message recording subsystem, may also be implemented on mobile device 1000. Although voice or audio signal output is usually accomplished primarily through the speaker 1034, display

1022 may also be used to provide an indication of the identity of a calling party, the duration of a voice call, or other voice call related information for example.

Serial port 1030 in FIG. 10, may be implemented in a personal digital assistant (PDA)-type mobile device for which synchronization with a user's desktop computer (not shown). Such a port 1030 would enable a user to set preferences through an external device or software application and would extend the capabilities of mobile device 1000 by providing for information or software downloads to mobile device 1000 other than through a wireless communication network. The alternate download path may for example be used to load an encryption key onto the device through a direct and thus reliable and trusted connection to thereby enable secure device communication. As will be appreciated by those skilled in the art, serial port 1030 can further be used to connect the mobile device to a computer to act as a modem. A modem unit 1060 interacts with a driver 1062 in a computer 1064 to allow data transfer through the mobile device. With EVDO networks, a high rate of data transfer can be achieved using the mobile device 1000 as the modem.

Other communications subsystems 1040, such as a short-range communications subsystem, is a further optional component which may provide for communication between mobile device 1000 and different systems or devices, which need not necessarily be similar devices. For example, the subsystem 1040 may include an infrared device and associated circuits and components or a Bluetooth™ communication module to provide for communication with similarly enabled systems and devices.

The previous description of the disclosed embodiments is provided to enable any person skilled in the art to make or use the methods and apparatus. Various modifications to those embodiments will be readily apparent to those skilled in the art, and the generic principles defined herein may be applied to other embodiments without departing from the spirit or scope of the methods and apparatus. Thus, the present methods and apparatus are not intended to be limited to the embodiments shown herein, but the methods and apparatus are to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims.

The embodiments presented herein are exemplary only, and persons skilled in the art would appreciate that variations to the embodiments may be made without departing from the spirit of the methods and apparatus described herein. The scope of the methods and apparatus is solely defined by the appended claims.

The invention claimed is:

1. A method for selecting a transport protocol for conveying streaming content to a mobile device, the method comprising:
   tracking in a configuration repository at the mobile device previous successful use of one of a plurality of transport protocols, said tracking comprising:
      attempting to convey streaming content over a data network infrastructure using said one of the plurality of transport protocols;
      if said attempting is successful, storing said one of the plurality of transport protocols in an entry in said configuration repository corresponding to said data network infrastructure; and
   defaulting to employing the previously successfully used transport protocol specified in said configuration repository corresponding to a data network infrastructure with which said mobile device is associated to provide data communications to the mobile device.

2. The method claimed in claim 1, wherein said tracking further comprises tracking successful use of said transport protocol for each one of a plurality of content streaming servers.

3. The method claimed in claim 2, wherein said defaulting further comprises defaulting to employing said transport protocol for said data network infrastructure and one of said plurality of content streaming servers.

4. The method claimed in claim 1 further comprising:
   a. tracking in the configuration repository previous successful use of said transport protocol in conveying streaming content over said one data network infrastructure having a network identifier; and
   b. defaulting to employing said transport protocol corresponding to said data network infrastructure having said network identifier.

5. The method claimed in claim 4, wherein said defaulting further comprises defaulting to employing said transport protocol for said data network infrastructure and one of a plurality of content streaming servers.

6. The method claimed in claim 1, wherein the data network infrastructure is one of WiFi, WiMAX, EVDO, GSM, GPRS, CDMA, UMTS, LTE, or LTE-A.

7. The method claimed in claim 1, wherein said one of the plurality of transport protocols is one of Universal Datagram Protocol (UDP) and Transport Control Protocol (TCP).

8. The method claimed in claim 7, wherein said tracking further comprises:
   if said attempting is not successful, assigning the other one of said UDP and TCP transport protocols for use in a subsequent streaming content start attempt over said data network infrastructure,
      i. if said subsequent streaming content start attempt is successful, storing said subsequently assigned transport protocol in the entry in said configuration repository corresponding to said data network infrastructure,
      ii. else ending.

9. The method claimed in claim 8, wherein in determining success of each streaming start attempt the method further comprises waiting for a predetermined period of time to receive streaming content related data.

10. A mobile device configured to select a transport protocol for conveying streaming content thereto, the mobile device comprising:
   a. at least one radio frequency transceiver configured to establish data communications via at least two data network infrastructures;
   b. a processor;
   c. memory storage;
   d. a configuration repository stored in said memory storage; and
   e. coded machine logic stored in said memory storage, said coded machine logic being executable on said processor to:
      i. track, in said configuration repository, previous successful use of one of a plurality of transport protocols, said tracking comprising:

attempting to convey streaming content over a data network infrastructure using said one of the plurality of transport protocols;

if said attempting is successful, storing said one of the plurality of transport protocols in an entry in said configuration repository corresponding to said data network infrastructure; and ii. default to employing the previously successfully used transport protocol specified in said configuration repository corresponding to a data network infrastructure with which said mobile device is associated to provide data communications to said mobile device.

11. The mobile device claimed in claim 10, wherein tracking said coded machine logic further comprises tracking successful use of said transport protocol for each one of a plurality of content streaming servers.

12. The mobile device claimed in claim 11, wherein defaulting said coded machine logic further comprises defaulting to employing said transport protocol for said data network infrastructure and one of said plurality of content streaming servers.

13. The mobile device claimed in claim 10, wherein the data network infrastructure is one of wireless data network infrastructure and a cellular data communications infrastructure.

14. The mobile device claimed in claim 10, wherein said one of the plurality of transport protocols is one of Universal Datagram Protocol (UDP) and Transport Control Protocol (TCP).

15. The mobile device claimed in claim 14, wherein tracking said coded machine logic further comprises:

if said attempting is not successful, assigning the other one of said UDP and TCP transport protocols for use in a subsequent streaming content start attempt over said data network infrastructure, i. if said subsequent streaming content start attempt is successful, storing said subsequently assigned transport protocol in the entry in said configuration repository corresponding to said data network infrastructure, else ending.

16. The mobile device claimed in claim 15, wherein in determining success of each streaming start attempt the said coded machine logic further comprises waiting for a predetermined period of time to receive streaming content related data.

17. The mobile device claimed in claim 16, wherein the predetermined period of time is 10 seconds.

18. The mobile device claimed in claim 13, wherein said wireless data network infrastructure is WiFi or WiMAX compliant.

19. The mobile device claimed in claim 13, wherein said cellular data communications infrastructure includes one of CDMA, EVDO, CDMA2000, GSM, GPRS, UMTS, LTE, or LTE-A.

20. The mobile device claimed in claim 10, wherein said transport protocol is one of at least three transport protocols.

21. The mobile device claimed in claim 20 further comprising transport protocol cycling means for selecting a transport protocol from said at least three transport protocols in progressive attempts to start content streaming.

22. The mobile device claimed in claim 20 further comprising transport protocol switching means for selecting a transport protocol from said at least three transport protocols in progressive attempts to start content streaming.

23. The mobile device claimed in claim 22 wherein the transport protocol switching means comprises a state machine.

24. The mobile device claimed in claim 10, said coded machine logic being further executable on said processor to:

a. track the configuration repository previous successful use of said transport protocol in conveying streaming content over said one data network infrastructure having a network identifier; and b. default to employing said transport protocol corresponding to said data network infrastructure having said network identifier.

25. The mobile device claimed in claim 24, wherein defaulting said coded machine logic further comprises defaulting to employing said transport protocol for said data network infrastructure and one of a plurality of content streaming servers.

\* \* \* \* \*